(12) United States Patent
Shah et al.

(10) Patent No.: US 11,001,123 B2
(45) Date of Patent: May 11, 2021

(54) THERMAL MANAGEMENT UNIT AND SYSTEM

(71) Applicant: ARRIVAL LIMITED, Banbury (GB)

(72) Inventors: Mazuir Shah, Banbury (GB); Ben Jardine, Banbury (GB)

(73) Assignee: ARRIVAL LIMITED, Banbury (GB)

( * ) Notice: Subject to any disclaimer, the term of this patent is extended or adjusted under 35 U.S.C. 154(b) by 47 days.

(21) Appl. No.: 16/479,514

(22) PCT Filed: Jan. 16, 2018

(86) PCT No.: PCT/EP2018/050996
§ 371 (c)(1),
(2) Date: Jul. 19, 2019

(87) PCT Pub. No.: WO2018/134195
PCT Pub. Date: Jul. 26, 2018

(65) Prior Publication Data
US 2019/0337355 A1  Nov. 7, 2019

(30) Foreign Application Priority Data
Jan. 19, 2017  (GB) ..................................... 1700934

(51) Int. Cl.
*B60H 1/00* (2006.01)
*H01M 10/625* (2014.01)
(Continued)

(52) U.S. Cl.
CPC ......... *B60H 1/00278* (2013.01); *B60H 1/004* (2013.01); *B60H 1/00007* (2013.01);
(Continued)

(58) Field of Classification Search
CPC ............ B60H 1/00278; B60H 1/00007; B60H 1/3229; B60H 2001/00307; H01M 10/625;
(Continued)

(56) References Cited

U.S. PATENT DOCUMENTS 2,180,760 A * 11/1939 Mayo ................. B60H 1/00207
62/243
3,181,308 A * 5/1965 Vander Hagen ........ F25B 11/00
62/238.4
(Continued)

FOREIGN PATENT DOCUMENTS

| FR | 2865070 | 7/2005 |
|---|---|---|
| WO | WO2014143621 | 9/2014 |
| WO | WO2016093744 | 6/2016 |

OTHER PUBLICATIONS

PCT Search Report for corresponding PCT Application No. PCT/EP2018/050996 dated May 7, 2018, 4 pages.
(Continued)

*Primary Examiner* — Claire E Rojohn, III
(74) *Attorney, Agent, or Firm* — Lee & Hayes, P.C.

(57) ABSTRACT

A thermal management unit for providing cooling or heating to regions of a vehicle. The thermal management unit comprises a housing (11) containing a compressor (13) and a first evaporator (12) of a refrigerant system; a pump (36), a heater (39) as first radiator of a heating system; and a blower (17). The blower is configured to force air over the first evaporator and first radiator to cool or heat the air. The housing comprises an airflow outlet (46) through which the cooled or heated air can exit the housing, and an airflow inlet (47) though which air can enter the housing to be recirculated by the blower. The housing comprises a first refrigerant outlet port (16) through which refrigerant compressed by the compressor can pass out of the housing, and a second
(Continued)

refrigerant inlet port (31) through which refrigerant can return into the housing for the supply to the first evaporator (12).

19 Claims, 7 Drawing Sheets

(51) Int. Cl.
    *H01M 10/6563*     (2014.01)
    *H01M 10/663*     (2014.01)
    *B60H 1/32*     (2006.01)

(52) U.S. Cl.
    CPC ........ *B60H 1/3229* (2013.01); *H01M 10/625* (2015.04); *H01M 10/6563* (2015.04); *H01M 10/663* (2015.04); *B60H 2001/00307* (2013.01); *H01M 2220/20* (2013.01)

(58) Field of Classification Search
    CPC .......... H01M 10/6563; H01M 10/663; H01M 2220/20
    USPC ....................................................... 165/202
    See application file for complete search history.

(56) References Cited

U.S. PATENT DOCUMENTS

| | | | | |
|---|---|---|---|---|
| 5,127,576 A * | 7/1992 | Weatherhead | ..... | B60H 1/00885 165/202 |
| 5,222,372 A | 6/1993 | DeRees et al. | | |
| 5,305,823 A * | 4/1994 | Elliot | ................ | B60H 1/00021 137/896 |
| 5,307,645 A * | 5/1994 | Pannell | .............. | B60H 1/00364 454/144 |
| 5,333,678 A * | 8/1994 | Mellum | ............. | B60H 1/00378 122/26 |
| 5,450,894 A * | 9/1995 | Inoue | ................ | B60H 1/00664 165/43 |
| 6,932,148 B1 * | 8/2005 | Brummett | .......... | B60H 1/00378 123/142.5 R |
| 8,424,776 B2 * | 4/2013 | Veettil | ................ | B60H 1/00028 237/12.3 A |
| 8,544,533 B2 * | 10/2013 | Lee | .................... | B60H 1/00671 165/202 |
| 8,763,425 B2 * | 7/2014 | Sugitani | ................ | F04D 29/063 62/510 |
| 9,205,720 B2 * | 12/2015 | Han | ................... | B60H 1/00485 |
| 9,975,400 B2 * | 5/2018 | Farooq | ............... | B60H 1/00771 |
| 10,124,649 B2 * | 11/2018 | Patel | .................... | B60H 1/2206 |
| 10,576,806 B1 * | 3/2020 | Madireddi | ......... | B60H 1/00378 |
| 2003/0070849 A1 * | 4/2003 | Whittaker | ............ | B60H 1/3226 180/68.2 |
| 2005/0016723 A1 * | 1/2005 | Araki | ................. | B60H 1/00028 165/202 |
| 2005/0198986 A1 * | 9/2005 | Allen | ..................... | B60H 1/323 62/244 |
| 2006/0000594 A1 * | 1/2006 | Kang | ................. | B60H 1/00064 165/203 |
| 2006/0075766 A1 * | 4/2006 | Ziehr | ................. | B60H 1/00828 62/186 |
| 2006/0196205 A1 * | 9/2006 | Richter | ................ | B60H 1/0005 62/239 |
| 2007/0009787 A1 * | 1/2007 | Straubel | ............. | H01M 50/502 429/99 |
| 2009/0280395 A1 | 11/2009 | Nemesh et al. | | |
| 2011/0269387 A1 | 11/2011 | Leffert et al. | | |
| 2011/0296855 A1 * | 12/2011 | Johnston | ................ | B60K 11/02 62/79 |
| 2014/0193683 A1 * | 7/2014 | Mardall | ........... | H01M 10/6562 429/99 |
| 2014/0223943 A1 * | 8/2014 | Ichishi | ................. | B60H 1/3205 62/215 |
| 2015/0217622 A1 * | 8/2015 | Enomoto | ........... | B60H 1/00278 165/42 |
| 2015/0380785 A1 * | 12/2015 | Takeuchi | ............ | H01M 10/625 429/62 |
| 2016/0116197 A1 | 4/2016 | Takeuchi et al. | | |
| 2017/0232817 A1 * | 8/2017 | Hutchison | ............ | B60H 1/3232 165/42 |
| 2017/0240024 A1 * | 8/2017 | Blatchley | ........... | B60H 1/00007 |
| 2018/0001784 A1 * | 1/2018 | Porras | ....................... | F25B 5/02 |
| 2018/0006347 A1 * | 1/2018 | Porras | ....................... | H01M 10/633 |
| 2019/0118610 A1 * | 4/2019 | Johnston | ............ | B60H 00899 |
| 2019/0225052 A1 * | 7/2019 | Zenner | .............. | B60H 1/00271 |
| 2019/0299791 A1 * | 10/2019 | Gonze | ............... | B60H 1/00278 |
| 2020/0047586 A1 * | 2/2020 | Gonze | ............... | B60H 1/00385 |
| 2020/0047591 A1 * | 2/2020 | He | ....................... | B60H 1/3227 |
| 2020/0052356 A1 * | 2/2020 | Eadelson | ............ | H01M 10/613 |
| 2020/0247215 A1 * | 8/2020 | Kozasa | ................ | B60H 1/143 |
| 2020/0324611 A1 * | 10/2020 | Yano | ..................... | B60H 1/004 |
| 2020/0331504 A1 * | 10/2020 | Glinka | ............... | B61D 27/0018 |
| 2020/0343601 A1 * | 10/2020 | Carlson | .................. | B60L 58/26 |

OTHER PUBLICATIONS

GB Search Report for correspondong GB Patent Application No. GB1700934.1 dated May 24, 2017, 5 pages.

* cited by examiner

THERMAL MANAGEMENT UNIT AND SYSTEM

This Application is a US National Phase application filed under 35 USC § 371 of PCT Application PCT/EP2018/050996, filed Jan. 16, 2018, which claims priority to GB Application 1700934.1, filed Jan. 19, 2017, which is incorporated herein by reference.

TECHNICAL FIELD

The present invention relates to a thermal management unit and system and, in particular, to a thermal management unit and system for use in a vehicle.

BACKGROUND

The drive for more fuel efficient and environmentally friendly transport solutions is seeing an increasing level of development in the field of electric vehicles. Such vehicles include not only passenger vehicles for personal transport, but also commercial vehicles such as buses and trucks. Such electric vehicles (EVs) include pure battery electric vehicles (BEVs) powered by batteries alone, and range extender electric vehicles (REEVs) which also include an additional power source, such as a small internal combustion engine (ICE) connected to an electrical generator, to generate electricity to is charge the battery and/or to supplement the battery power source. All such EVs include battery packs for supplying electrical power to the electric drive motor(s). Such battery packs typically comprise a number of connected battery modules contained within a battery box.

The battery modules within such battery packs optimally function within a certain temperature range. Also, the battery modules can generate heat during use. There is therefore the need to thermally manage the battery packs to achieve desirable performance levels. In addition, it is desirable for EVs to achieve improved performance and fuel efficiency with a reduced system complexity and weight.

SUMMARY

In accordance with embodiments of the invention, there is provided a thermal management unit for providing cooling or heating to regions of a vehicle, the thermal management unit comprising a housing containing a compressor and a first evaporator of a refrigerant system; a pump, a heater and a first radiator of a heating system; and a blower, wherein the blower is configured to force air over the first evaporator and first radiator to cool or heat the air; wherein the housing comprises an airflow outlet through which the cooled or heated air can exit the housing, and an airflow inlet though which air can enter the housing to be recirculated by the blower; and wherein the housing comprises a first refrigerant outlet port through which refrigerant compressed by the compressor can pass out of the housing, and a first refrigerant inlet port through which refrigerant can return into the housing, the first refrigerant inlet port being in fluid communication with the first evaporator for the supply of returning refrigerant to the first evaporator.

The housing may include a heating fluid outlet port through which heating fluid under pressure from the pump and heated by the heater, can pass out of the housing.

The thermal management unit may comprise a heating fluid inlet port through which heating fluid can return into the housing, the heating fluid inlet port being in fluid communication with the pump for the supply of returning heating fluid to the pump.

The housing may contain a drier in fluid communication between the first refrigerant inlet port and the first evaporator such that refrigerant returning into the housing through the first refrigerant inlet port passes through the drier before passing to the first evaporator.

The housing may include a partition dividing the interior of the housing into a first section and a second section, and wherein the compressor may be disposed in the first section, and wherein the first evaporator may be disposed in the second section.

The partition may comprise a dividing wall that is configured to prevent or restrict heat transfer between the first and second sections of the housing.

The airflow outlet may include an outlet manifold having two or more manifold outlets, the manifold configured such that airflow out of the housing passes through the two or more manifold outlets.

An airflow control valve may be provided in the airflow outlet or one or more of the manifold outlets, to selectively prevent, permit or restrict airflow through the airflow outlet or one or more of the manifold outlets.

The pump may be configured to pump heating fluid to an inlet of the heater, and an outlet of the heater may be fluidly communicated with an inlet of the first radiator, and wherein a first heating valve may be disposed in a pipe fluidly connecting the heater to the first radiator.

The outlet of the heater may also be fluidly communicated with the heating fluid outlet port, and a second heating valve may be disposed in a pipe fluidly connecting the heater to the heating fluid outlet port.

The outlet of the heater may also be fluidly communicated with the heating fluid outlet port, and the first heating valve may comprise a three-way valve which is disposed between an outlet of the heater, an inlet of the first radiator and the heating fluid outlet port.

An outlet of the first radiator may be fluidly connected to an inlet of the pump, and wherein the heating fluid inlet port may also be connected to an inlet of the pump, and wherein a three-way heating valve may be disposed between the outlet of the first radiator, the heating fluid inlet port and the inlet of the pump.

A first refrigerant valve may be disposed in a pipe fluidly connecting the drier to the first evaporator.

The housing may further comprise a second refrigerant outlet port in fluid communication with an outlet of the drier, and a second refrigerant valve may be disposed in a pipe fluidly connecting an outlet of the drier to the second refrigerant outlet port.

The housing may further comprise a second refrigerant outlet port in fluid communication with an outlet of the drier, and the first refrigerant valve may comprise a three-way valve which is disposed between an outlet of the drier, an inlet of the first evaporator and the second refrigerant outlet port.

The housing may further comprise a first thermal expansion valve in fluid communication with the first evaporator and configured such that refrigerant passes through the first thermal expansion valve before passing into the first evaporator.

A ventilation passage may be provided within the housing extending between the airflow inlet and the airflow outlet, and wherein the first evaporator and the first radiator may be disposed within the ventilation passage, and wherein the blower may be configured to drive airflow from the inlet to the outlet through the ventilation passage.

The thermal management unit may further comprise a control apparatus comprising at least one processor and at least one memory, wherein the control apparatus may be connected to and configured to control operation of one or more of the compressor, pump, heater, blower, the or each airflow control valve, the first and/or second heating valves, and the first and/or second refrigerant valves.

The present invention also provides a thermal management system comprising a thermal management unit as described above, further comprising a condenser disposed outside the housing, wherein the first refrigerant outlet port may be fluidly communicated with an inlet of the condenser, and an outlet of the condenser may be fluidly communicated with the first refrigerant inlet port. A third blower may be provided and configured to force airflow over and/or through the condenser.

The thermal management system may further comprise a second evaporator of the refrigerant system, and a second radiator of the heating system, and a second blower configured to force air over the second evaporator and second radiator to cool or heat the air, the second evaporator and second radiator may be disposed outside the housing, the heating fluid outlet port may be fluidly communicated with an inlet of second radiator, and an outlet of the second radiator may be fluidly communicated with the heating fluid inlet port.

An outlet of the condenser may also be fluidly communicated with an inlet of the second evaporator, and an outlet of the second evaporator may be fluidly communicated with the compressor via a second refrigerant inlet port provided in the housing.

A first refrigerant valve may be disposed in a pipe fluidly connecting the outlet of the condenser to the first refrigerant inlet port.

A second refrigerant valve may be disposed in a pipe fluidly connecting the outlet of the condenser to the inlet of the second evaporator.

The first refrigerant valve may comprise a three-way valve which is disposed between an outlet of the condenser, the inlet of the second evaporator and the first refrigerant inlet port.

The second refrigerant outlet port may be fluidly connected to the inlet of the second evaporator.

The thermal management system may further comprise a second thermal expansion valve in fluid communication with the second evaporator and configured such that refrigerant passes through the second thermal expansion valve before passing into the second evaporator.

The thermal management system may further comprise a climate control user interface connected to the control apparatus and configured to receive user input regarding operation of the thermal management system and to send signals to the control apparatus in response to the user input to determine operation of the thermal management system.

The thermal management system may further comprise at least one first temperature sensor connected to the control apparatus and configured to send signals representing a sensed temperature to the control apparatus, the control apparatus configured to control operation of the thermal management system to heat or cool airflow by the first evaporator or first radiator dependent on the temperature signal received from the at least one first temperature sensor.

The thermal management system may further comprise at least one second temperature sensor connected to the control apparatus and configured to send signals representing a sensed temperature to the control apparatus, the control apparatus configured to control operation of the thermal management system to heat or cool airflow by the second evaporator or second radiator dependent on the temperature signal received from the at least one second temperature sensor.

The present invention also provides a vehicle comprising a chassis, a cab, at least one battery pack, and a thermal management system as described above, wherein the thermal management unit may be configured to feed the heated or cooled airflow from the airflow outlet to the at least one battery pack, and to feed airflow back from the at least one battery pack to the airflow inlet.

At least one airflow duct may extend from the airflow outlet to the at least one battery pack, and at least one airflow duct may extend from the at least one battery pack to the airflow inlet.

The vehicle may comprise a plurality of battery packs, and the thermal management system may be configured to feed the heated or cooled airflow from the airflow outlet to each of the battery packs, and to feed airflow back from each of the battery packs to the or each airflow inlet.

The at least one temperature sensor may be disposed within the at least one battery pack and may be configured to sense air temperature within the at least one battery pack.

The second evaporator, second radiator and second blower may be configured to provide the heated or cooled air from the second blower forcing air over the second evaporator, second radiator, into the vehicle cab.

The second evaporator, second radiator and second blower may be disposed within the cab of the vehicle.

The at least one second temperature sensor may be disposed within the cab and may be configured to sense air temperature within the cab.

BRIEF DESCRIPTION OF THE DRAWINGS

Embodiments of the present invention will now be described, by way of example only, with reference to the accompanying drawings, in which.

DETAILED DESCRIPTION

Figure 1:
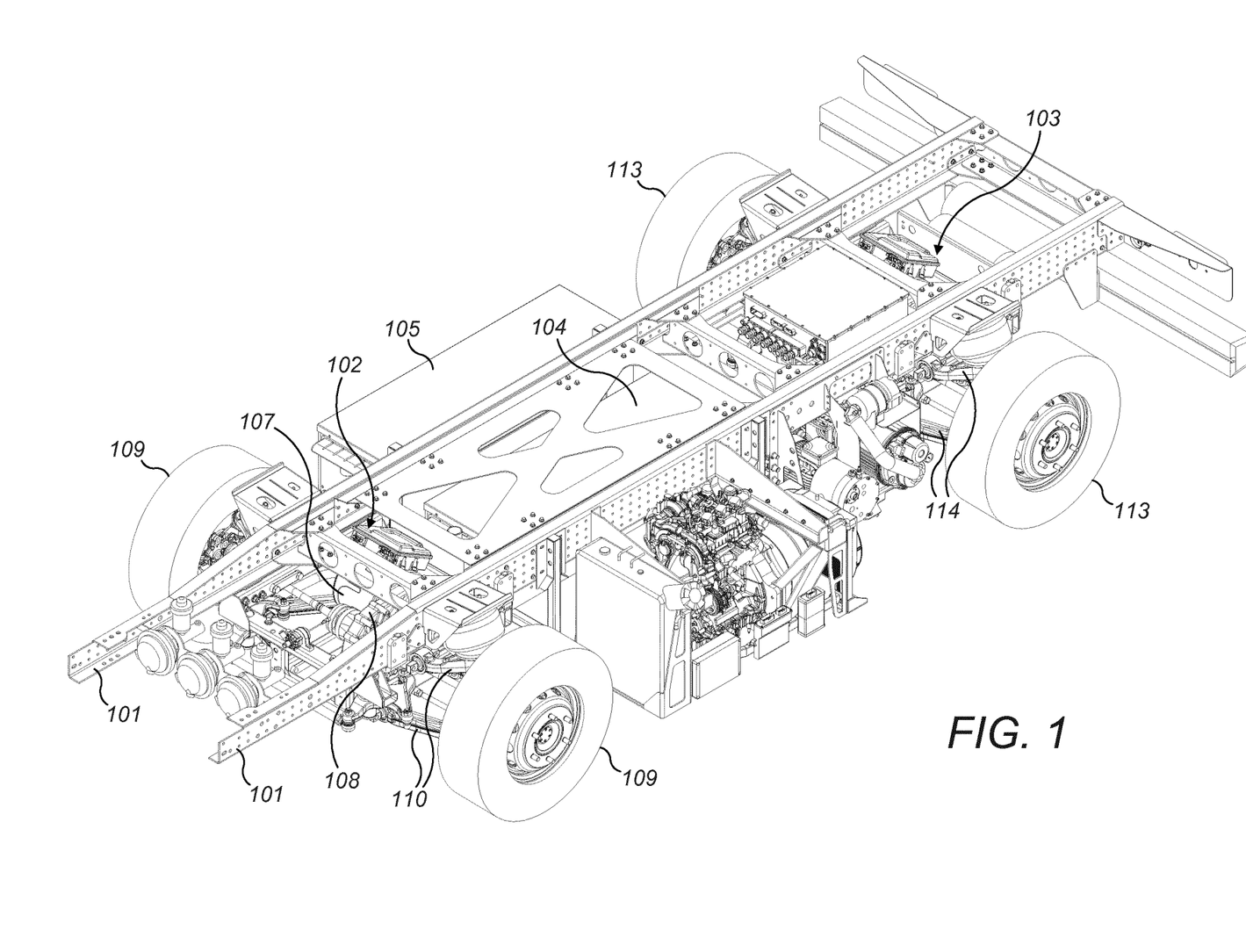
FIG. 1 shows a perspective view of an exemplary vehicle chassis to which may be applied thermal management systems of embodiments of the invention.

FIG. 1 shows a chassis 100 of an exemplary commercial REEV to which a thermal management system 10 of an embodiment of the invention may be installed. The chassis 100 comprises a pair of chassis rails 101 to which are mounted a front drivetrain module 102, a rear drivetrain module 103, first and second high voltage battery packs 104, 105 and a range extender unit 106.

The front drivetrain module 102 comprises an electric motor 107 and a gearbox 108 which drive front wheels 109 mounted on suspension arms 110. Similarly, the rear drivetrain module 103 comprises an electric motor and a gearbox (not shown—although these are advantageously the same components and configuration as those of the front drivetrain module) which drive rear wheels 113 mounted on suspension arms 114.

The first high voltage battery pack 104 is mounted between the chassis rails 101 and the second high voltage battery pack 105 is mounted on a side of the chassis 100 on an outside of a right chassis rail 101. The high voltage battery packs 104, 105 each generally comprise a closed housing or battery box containing a plurality of battery modules and control electronics for controlling operation of the battery modules. The range extender unit 106 is mounted on an opposite side of the chassis 100 to the second battery pack 105, on an outside of a left chassis rail 101. In an alternative configuration however, the range extender unit 106 may be omitted and the first high voltage battery pack 104 may be mounted in its place on the opposite side of the chassis 100 to the second battery pack 105, on an outside of a left chassis rail 101. Such an alternative configuration is shown schematically in FIG. 3 and described in more detail later.

Figure 2:
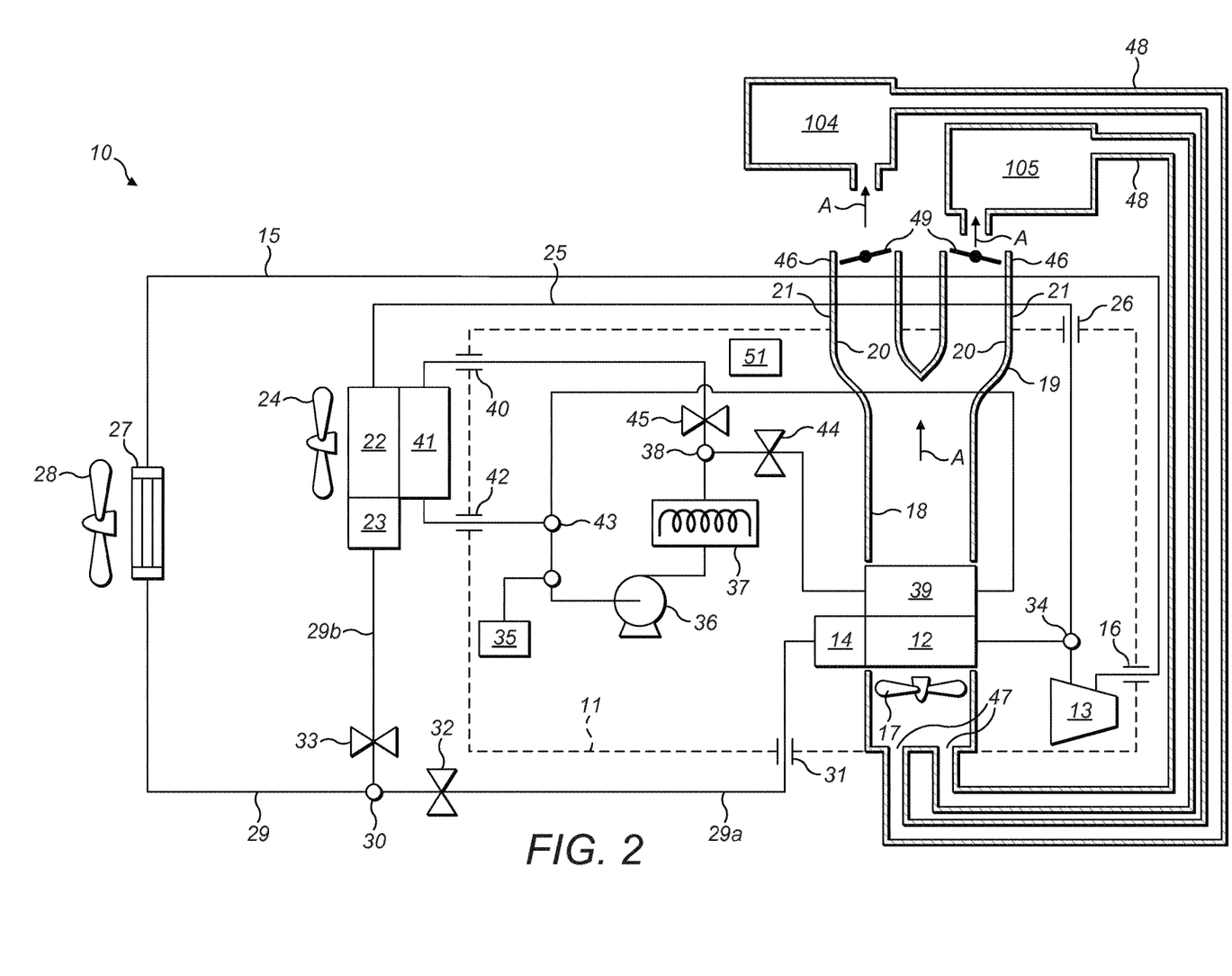
FIG. 2 shows a schematic system diagram of a thermal management system of a first embodiment of the invention.
Figure 3:
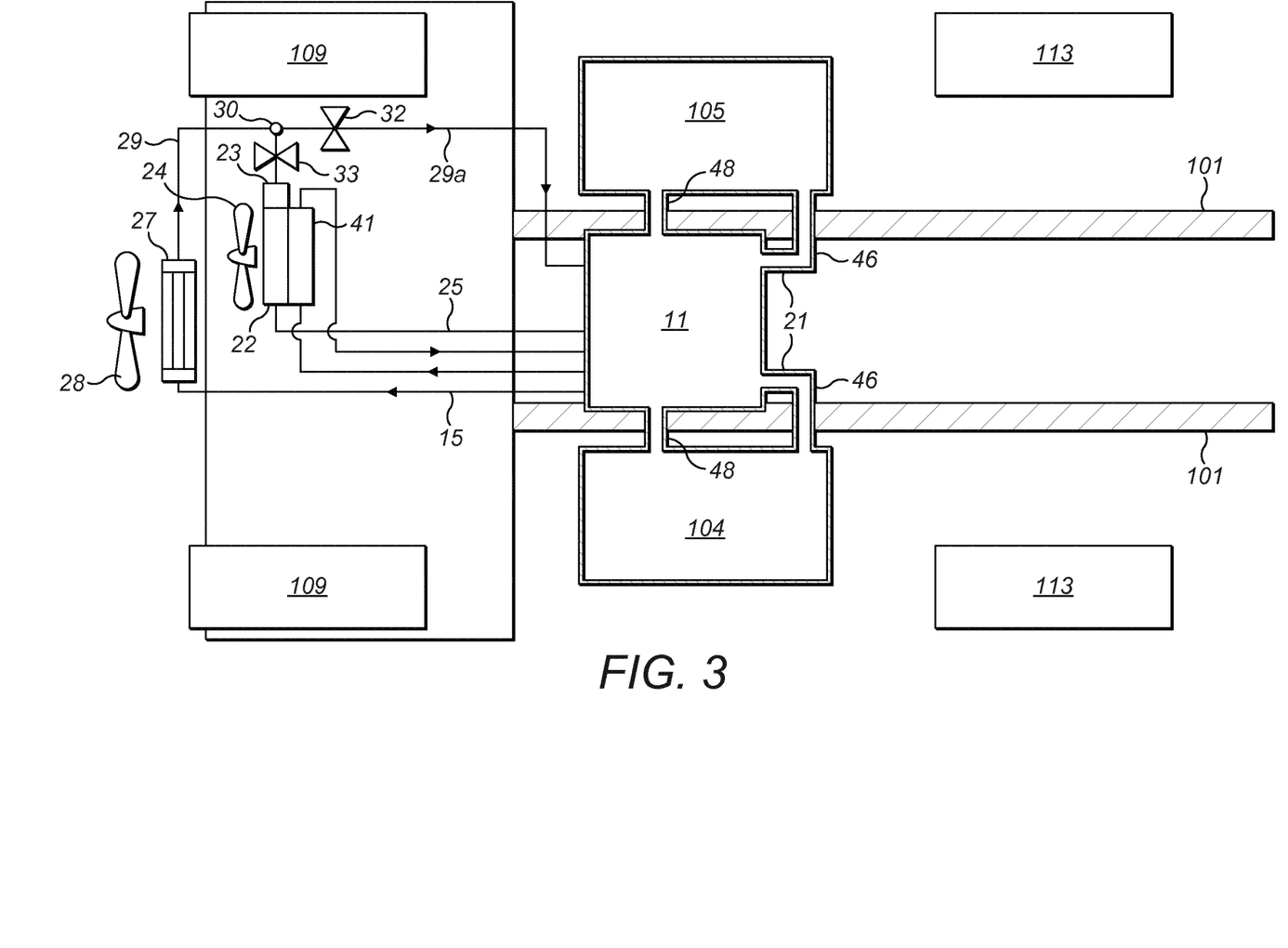
FIG. 3 shows a schematic diagram of the thermal management system of FIG. 2 and its layout on the exemplary vehicle of FIG. 1.

Referring to FIGS. 2 to 3, the thermal management system 10 comprises a housing 11 which contains a number of components of a vehicle HVAC (Heating, Ventilation, Air Conditioning) system. The housing 11 and the components of the thermal management system 10 contained within the housing 11 comprise a thermal management unit ('TMU') 10a. In the schematic drawing of FIG. 2, the housing 11 is represented by dashed lines and illustrates the components of the thermal management system 10 contained within the housing 11 and comprising the TMU 10a. Within the housing 11 is provided a first evaporator 12 and a compressor 13. A first thermal expansion valve 14 is provided adjacent to the evaporator 12 within the housing 11. The first thermal expansion valve 14 is fluidly communicated with the first evaporator 12.

An outlet of the first evaporator 12 is fluidly communicated with an inlet of the compressor 13. A first pipe 15 is connected to an outlet of the compressor 13 and extends out of the housing 11 though a first outlet port 16. A first blower or fan 17 is provided to blow air over the first evaporator 12. The first evaporator 12 may be provided within a ventilation passage 18 provided within the housing 11 and the first fan 17 is configured to direct air though the ventilation passage 18 and across the first evaporator 12. The first fan 17 may also be provided in the ventilation passage 18, or may be adjacent an entrance opening of the ventilation passage 18. The ventilation passage 18 may include a manifold 19 downstream of the first evaporator 12 with respect to the airflow direction through the ventilation passage 18 generated by the fan 17 and as shown by arrows 'A' in FIG. 2. The manifold 19 is configured to divide the airflow 'A' into separate streams by including a plurality of airflow outlets 20. In the embodiment shown, the manifold includes two outlets 20, although more may be provided within the scope of the invention. The outlets 20 are fluidly communicated with respective housing airflow outlets 21 for the airflow 'A' to exit the housing 11.

The system includes a second evaporator 22 external to the housing 11. A second thermal expansion valve 23 is provided adjacent to the evaporator 22. The second thermal expansion valve 23 is fluidly communicated with the second evaporator 22. A second blower or fan 24 is provided and configured to blow air over the second evaporator 22.

A second pipe 25 extends from an outlet of the second evaporator 22 and passes into the housing 11 via a first inlet port 26, and is connected to an inlet of the compressor 13 to fluidly communicate the outlet of the second evaporator 22 with the inlet of the compressor 13. The second pipe 26 from the second evaporator 22 joins with the outlet from the first evaporator at a pipe junction 34 upstream of the inlet of the compressor 13, so that fluid from the outlets of the first and second evaporators 12, 22 is combined and fed to the compressor 13.

External to the housing 11 is provided a condenser 27. The first pipe 15 extends from the outlet of the compressor 13, via the first outlet port 16, to an inlet of the condenser 27 to fluidly communicate the compressor 13 with the condenser 27. A third fan 28 is provided adjacent the condenser 27 and is configured to blow air across the condenser 27.

A third pipe 29 extends from an outlet of the condenser and splits at a junction 30 into a first branch 29a which extends into the housing 11 through a second inlet port 31, and is fluidly connected to the first thermal expansion valve 14, and a second branch 29b which extends to the inlet of the second thermal expansion valve 23.

A first control valve 32 may be provided in the first branch 29a of the third pipe 29, and a second control valve 33 may be provided in the second branch 29b of the third pipe 29. The first and second control valves 32, 33 may be controlled to selectively permit or prevent fluid flow through the first and second branches 29a, 29b to the first and second thermal expansion valves, respectively.

It will be appreciated that the above system of components including the compressor 13, evaporators 12, 22, thermal expansion valves 14, 23, condenser 27 and connecting pipes may comprise a cooling refrigerant circuit through which a refrigerant fluid may be circulated. Through operation described in detail below, cooling air flow may be provided by the respective fans 17, 24 passing air over the evaporators 12, 22 as the refrigerant evaporates and absorbs heat from the air being passed over the evaporators 12, 22.

The thermal management system 10 also includes a heating function. Within the housing 11 is provided a header tank 35 or reservoir for containing heating fluid. The reservoir is fluidly connected to a heating circuit, comprising a pump 36, which is fluidly connected to a heater 37. An outlet pipe of the heater 37 is fluidly connected to a heating pipe junction 38. From the junction 38, one fluid pipe is fluidly connected to a first heater matrix or radiator 39, and another fluid pipe extends out of a second outlet port 40 to a second heater matrix or radiator 41. An outlet pipe from the first heater matrix 39 is fluidly connected to an inlet of the pump 36 for the return of heating fluid to the pump 36. An outlet pipe from the second heater matrix 41 passes into the housing n through a third inlet port 42 and is fluidly connected to an inlet of the pump 36 for the return of heating fluid to the pump 36. The outlet pipes from the first and second heater matrices 39, 41 join at a junction 43 and a single pipe is connected between the junction 43 and the inlet of the pump 36.

A first heater valve 44 may be provided in the pipe that extends from the junction 38 to the first heater matrix 39. A second heater valve 45 may be provided in the pipe that extends from the junction 38 to the second heater matrix 41. The first and second heater valves may be operated to selectively permit or prevent flow of heating fluid to the first and second heater matrices 39, 41 respectively. The first heater matrix 39 is disposed adjacent the first evaporator 12 such that air flow generated by the first fan 17 passes across both the first evaporator 12 and the first heater matrix 39. The second heater matrix 41 is disposed adjacent the second evaporator 22 such that air flow generated by the second fan 24 passes across both the second evaporator 22 and the second heater matrix 41.

The housing airflow outlets 21 are connected to airflow feed ducts 46. The airflow feed ducts 46 are connected to the containers of the first and second high voltage battery packs 104, 105 for the airflow 'A' to pass from the housing 11 to the battery packs 104, 105. The housing 11 also includes one or more airflow inlets 47. Airflow return ducts 48 are connected between the containers of the first and second high voltage battery packs 104, 105 and the airflow inlet(s) 47 for the return airflow 'A' to the housing 11. Thereby, the airflow 'A' can be circulated from the housing n of the thermal management system 10 to the battery packs 104, 105 and back to the housing 11. Airflow control valves 49 may be provided in the airflow feed ducts 46 to selectively open or close the airflow feed ducts 46 so as to selectively permit or prevent the flow of air through the airflow feed ducts 46.

The thermal management system 10 of the present invention may be used in any vehicle, but for the purpose of description herein, will be described with reference to an EV, particularly a REEV commercial vehicle delivery truck, of which the chassis is shown in FIG. 1. When installed in the truck, the housing 11 may be located in any suitable position, but advantageously may be disposed proximate the truck cab and the battery packs 104, 105, for most efficient operation and ease of installation (for example, minimising pipework in the vehicle, and heat losses from fluids through such pipework). The housing 11 may be located just behind the cab, or on the truck or cab roof. The thermal management system 10 of the invention is schematically shown installed on the vehicle chassis 100 of FIG. 1, in FIG. 3. The second evaporator 22, second heater matrix 41 and second fan 24 are advantageously disposed within a cab 111 of the truck, for example behind the dashboard. The condenser 27 and third fan 28 are advantageously disposed outside the truck cab 111 and spaced from the housing 11. Advantageously, the condenser 27 maybe located in a position on the truck such that ambient air may readily reach the condenser 27. The condenser 27 may be located at the front of the truck, as shown in FIG. 3, such that ambient air is forced over the condenser 27 when the truck is in motion, or may be disposed elsewhere on the truck and the third fan 28 can draw in ambient air to be blown over the condenser 27.

In operation, the thermal management system 10 may be used to cool the battery packs 104, 105 and cool the truck cab 111, or heat the battery packs 104, 105 and heat the truck cab, or combinations of both. The control of cooling or heating the truck cab 111 may be determined based on a driver's input for a desired comfortable temperature within the cab 111. The control of cooling or heating the battery packs 104, 105 may be determined based on a detected temperature within the battery packs, and in order to maintain the battery packs within an optimum operational temperature range.

Figure 4:
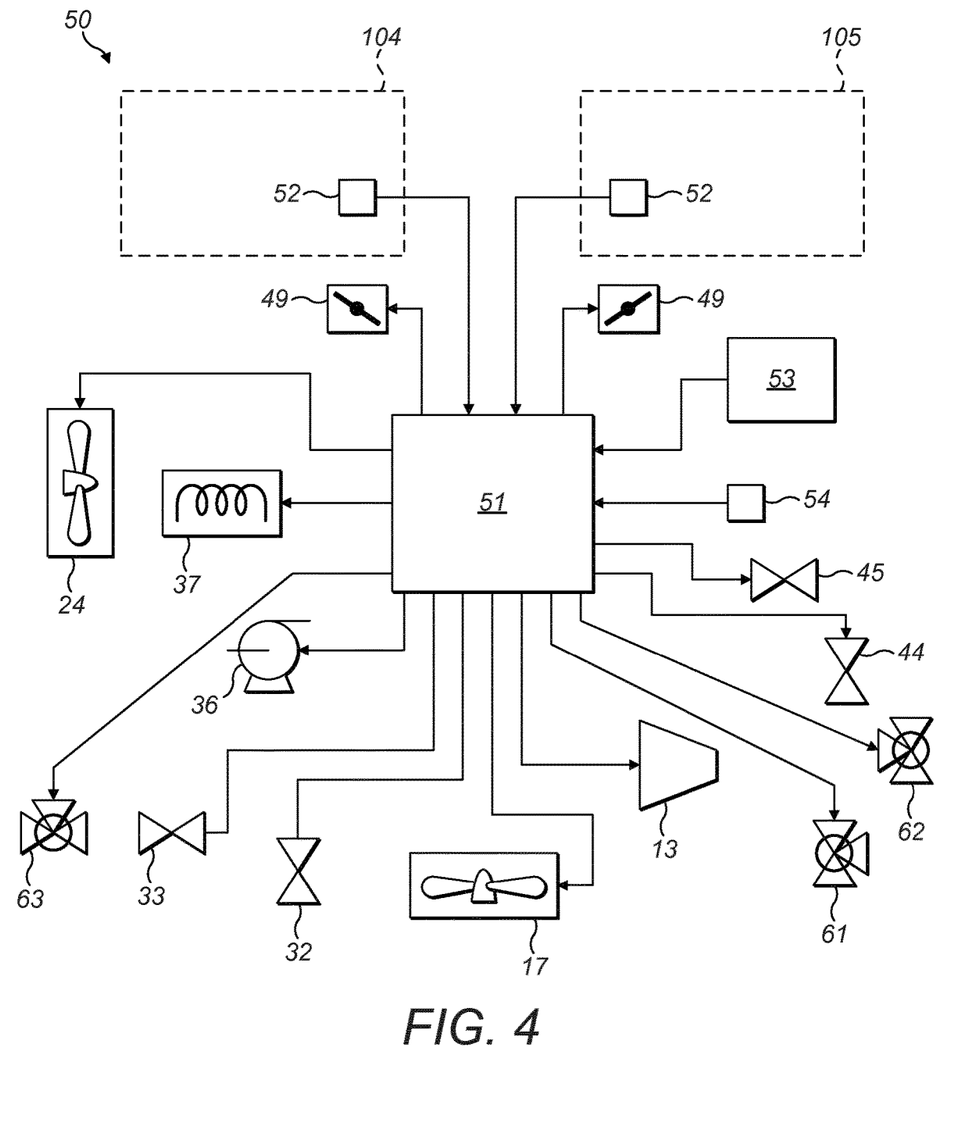
FIG. 4 shows a schematic controller diagram showing control features of the thermal management system of FIG. 2.
Figure 6:
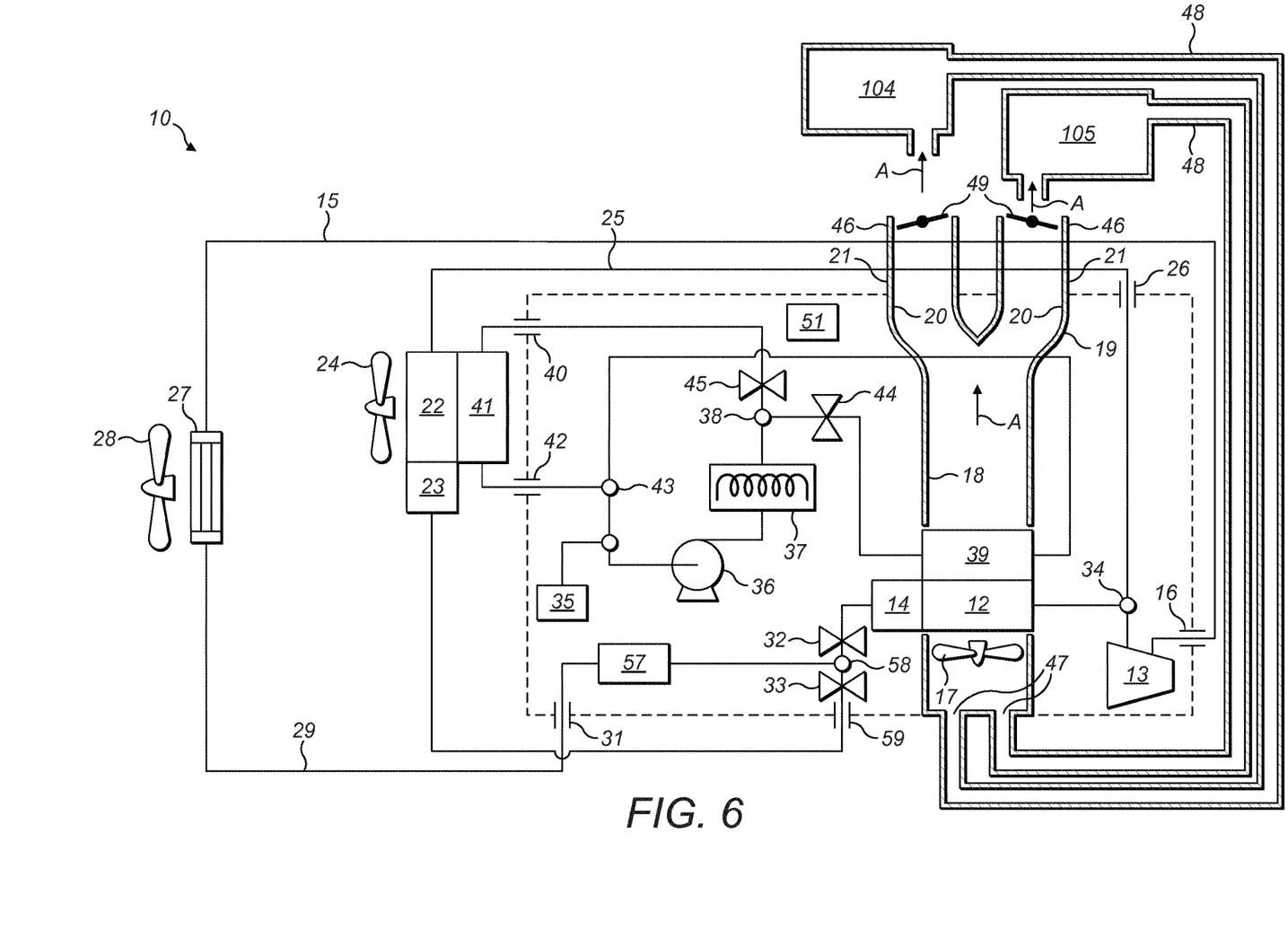
FIG. 6 shows a schematic system diagram of the second embodiment of thermal management system of the invention.
Figure 7:
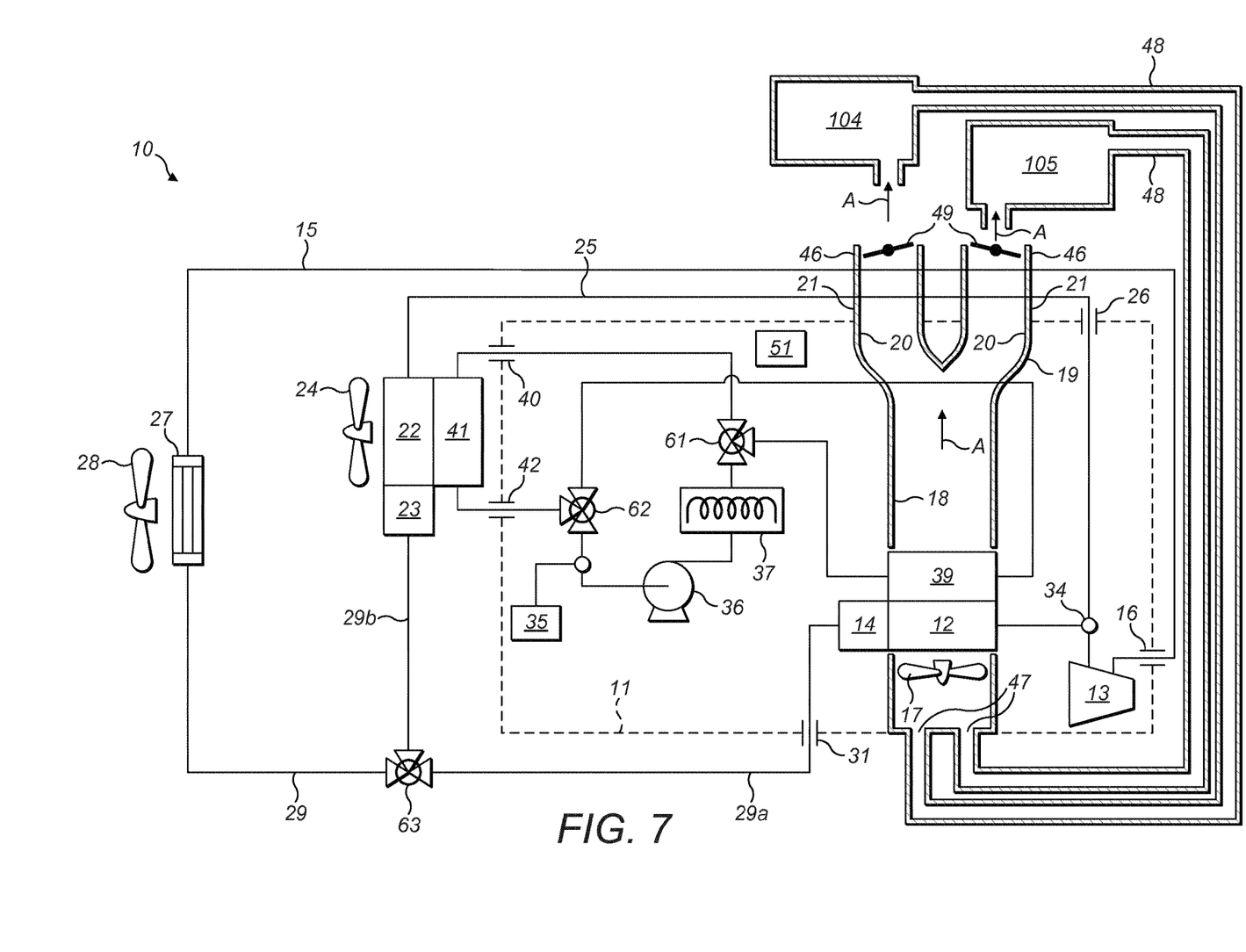
FIG. 7 shows a schematic system diagram of a thermal management system of a third embodiment of the invention.

An exemplary control system 50 of the thermal management system 10 is shown schematically in FIG. 4, with features of the thermal management system 10 described previously retaining the same reference numerals. A control apparatus 51 is provided and is configured to control operation of the various components of the thermal management system 10 as described below. The control apparatus 51 may comprise one or more separate controllers within the scope of the invention, which may be disposed together or distributed around the vehicle. The control apparatus 51 may comprise at least a processor and a memory. The control apparatus 51 may be configured to control operation of the compressor 13, first and second fans 17, 24, pump 36, heater 37, first and second control valves 32, 33, first and second heater valves 44, 45 and airflow control valves 49. The battery packs 104, 105 may include temperature sensors 52 and the control apparatus 51 may be configured to receive signals from the temperature sensors 52 indicative of the temperature within each respective battery pack 104, 105. The control apparatus 51 may advantageously be provided within the housing 11. FIGS. 2, 6 and 7 show the control apparatus 51 disposed within the housing 11, although for ease of illustration, the connections between the control apparatus 51 and the various components of the thermal management unit 10a and thermal management system 10, illustrated in FIG. 4, are not shown.

Within the cab 111 of the truck there may be provided a climate control user interface 53 which a user maybe able to operate to select a desired temperature setting within the cab 111. The control apparatus 51 may be configured to receive signals from the climate control user interface 53 indicative of a user-selected temperature setting within the cab 111. The cab 111 may include a cab temperature sensor 54 and the control apparatus 51 may be configured to receive signals from the cab temperature sensor 54 indicative of the temperature within the cab 111.

If a temperature sensor 49 within the battery packs 104, 105 detects that a temperature within the battery packs 104, 105 is at or within a predetermined margin of an upper threshold temperature of a predetermined optimum operating temperature range for the battery packs 104, 105, then the thermal management system 10 may be operated to cool the battery packs 104, 105. For example, the predetermined optimum operating temperature range may comprise between 0° C. and 50° C., and more preferably is between 20° C. and 40° C. Such situation may occur if the truck is being operated in hot ambient conditions, for example. In such a situation, the control apparatus 51 operates the compressor 13 to compress refrigerant fluid in the cooling circuit into a hot, high-pressure gas. The refrigerant gas then passes out of the first outlet port 16 though the first pipe 15 and flows to the condenser 27. The third fan 28 is actuated to blow air across the condenser 27 to encourage heat removal from the refrigerant within the condenser 27, such that the refrigerant exits the condenser 27 as a cooled, high pressure liquid.

The refrigerant then flows through the third pipe 29 to junction 30. If no demand for cooling has been received from the truck cab 111, the second control valve 33 may be closed, and the first control valve 32 is open, such that the refrigerant only flows through the first branch 29a, through the second inlet port 31 and to the first thermal expansion valve 14 and then to the first evaporator 12. The first fan 17 is actuated to blow air across the first evaporator 12 to encourage heat removal from the airflow to the refrigerant within the first evaporator 12, such that the refrigerant exits the first evaporator 12 as a cooled, low pressure gas. Accordingly, the airflow 'A' flowing through the ventilation passage 18 comprises cooled air. The first fan 17 drives the cooled airflow 'A' out of the housing 11 through the manifolds 19, 20 and housing airflow outlets 21, and to the battery packs 104, 105 via the airflow feed ducts 46. The cooled airflow 'A' circulates within the battery packs 104, 105, cooling the battery modules, and exits the battery packs 104, 105 via the airflow return ducts 48. The returning airflow 'A' re-enters the housing 11 and ventilation passage 18 through the airflow inlet 47 where it is recirculated by the first fan 17 over the first evaporator 12. After exiting the first evaporator 12, the refrigerant passes to the compressor 13 to be recirculated as described above.

If demand is received from the truck cab 111 for the cab to be cooled, for example via the climate control user interface 53, or by a temperature within the cab 111 detected by the cab temperature sensor 54 being at or above a predetermined threshold temperature, then the second control valve 33 may be opened such that refrigerant flowing through the third pipe 29, when reaching the junction 30, flows both into the first and second branch pipes 29a, 29b. The refrigerant flowing through the first branch pipe 29a continues as described above. The refrigerant flowing through the second branch pipe 29b passes to the second thermal expansion valve 23 and then to the second evaporator 22. The second fan 24 blows air across the second evaporator 22 to encourage heat removal from the airflow to the refrigerant within the second evaporator 22, such that the refrigerant exits the second evaporator 22 as a cooled, low pressure gas. Accordingly, the airflow downstream of the second evaporator 22 comprises cooled air, which can be directed in accordance with the cab ventilation controls (not shown) or climate control user interface 53, to cool the truck cab 111. After exiting the second evaporator 22, the refrigerant flows through the second pipe 25 and into the housing 11 through the first inlet port 26 and via the junction 34, where it combines with the refrigerant flowing from the first evaporator 12, to the compressor 13, to be recirculated as described above.

It will be appreciated that the thermal management system 10 may be operated only to cool the truck cab 111, without cooling of the battery packs 104, 150, by operating the first control valve 32 to be closed, and the second control valve 33 to be open.

If a temperature sensor 52 within the battery packs 104, 105 detects that a temperature within the battery packs 104, 105 is at or within a predetermined margin of a lower threshold temperature of a predetermined optimum operating temperature range for the battery packs 104, 105, then the thermal management system 10 may be operated to heat the battery packs 104, 105. Such situation may occur if the truck is being operated in cold ambient conditions, for example. In such a situation, the compressor 13 is controlled to remain off such that no refrigerant flows around the cooling circuit. The pump 36 is instead controlled to operate to pump heating fluid to the heater 37, which is controlled to operate to heat the heating fluid. The hot heating fluid then passes to the heating pipe junction 38.

If no demand for heating has been received from the truck cab 111, the second heater valve 45 may be closed, and the first heater valve 44 is open, such that hot heating fluid only flows to the first heater matrix 39. The first fan 17 blows air across the first heater matrix 39 to encourage heat transfer from the first heater matrix 39 to the airflow 'A'. Accordingly, the airflow 'A' flowing through the ventilation passage 18 comprises heated air. The first fan 17 drives the heated airflow 'A' out of the housing 11 and to the battery packs 104, 105 via the airflow feed ducts 46, manifolds 19, 20 and housing airflow outlets 21. The heated airflow 'A' circulates within the battery packs 104, 105, warming the battery modules, and exits the battery packs 104, 105 via the airflow return ducts 48. The returning airflow 'A' re-enters the housing 11 and ventilation passage 18 through the airflow inlet 47 where it is recirculated by the first fan 17 over the first heater matrix 39.

If demand is received from the truck cab 111 for the cab to also be heated, for example via the climate control user interface 53, or by a temperature within the cab 111 detected by the cab temperature sensor 54 being at or below a predetermined threshold temperature, then the second heater valve 45 may be opened such that heating fluid can flow from the heating pipe junction 38 to both the first and second heater matrices 39, 41, with the heating fluid flowing to the second heater matrix 41 outside of the housing 11 via the second outlet port 40. The second fan 24 blows air across the second heater matrix 41 to encourage heat transfer from the heating fluid within the second heater matrix 41. Accordingly, the airflow downstream of the second heater matrix 41 comprises heated air, which can be directed in accordance with the cab ventilation controls (not shown) or climate control user interface 53, to heat the truck cab 111. After exiting the second heater matrix 41, the heating fluid flows via the third inlet port 42 back into the housing 11 and to the pipe junction 43, where it combines with the heating fluid flowing from the first heater matrix 39, to the pump 36, to be recirculated as described above.

It will be appreciated that the thermal management system 10 may be operated only to heat the truck cab 111, without heating of the battery packs 104, 150, by operating the first heater valve 44 to be closed, and the second heater valve 45 to be open.

It will be appreciated from the above that by appropriate operation of the first and second control valves 32, 33 in the refrigerant circuit, and the first and second heater valves 44, 45 in the heating circuit, the thermal management system 10 of the invention may be operated to simultaneously heat the truck cab and cool the battery packs 104, 105, or to simultaneously cool the truck cab and heat the battery packs 104, 105. For example, if the thermal management system 10 is to simultaneously heat the truck cab and cool the battery packs 104, 105, then the second control valve 33 is closed to prevent refrigerant flowing to the second thermal expansion valve 23 and second evaporator 22, and the first heater valve 44 is closed to prevent heated heating fluid flowing to the first heater matrix 39. The compressor 13, pump 36 and heater 37 are then operated so that the refrigerant only flows to the first thermal expansion valve 14 and first evaporator 12 to provide cooling airflow 'A' to the battery packs as described above, and so heated heating fluid only flows to the second heater matrix 41 to provide heated air to the truck cab, as described above. Conversely, if simultaneous cooling of the truck cab and heating of the battery packs 104, 105 is required, then the first control valve 32 is closed to prevent refrigerant flowing to the first thermal expansion valve 14 and first evaporator 12, and the second heater valve 45 is closed to prevent heated heating fluid flowing to the second heater matrix 41. The compressor 13, pump 36 and heater 37 are then operated so that the refrigerant only flows to the second thermal expansion valve 23 and second evaporator 22 to provide cooled air to the truck cab, as described above, and so that heated heating fluid only flows to the first heater matrix 39 to provide heated air to the battery pack 104, 105, as described above.

Figure 5:
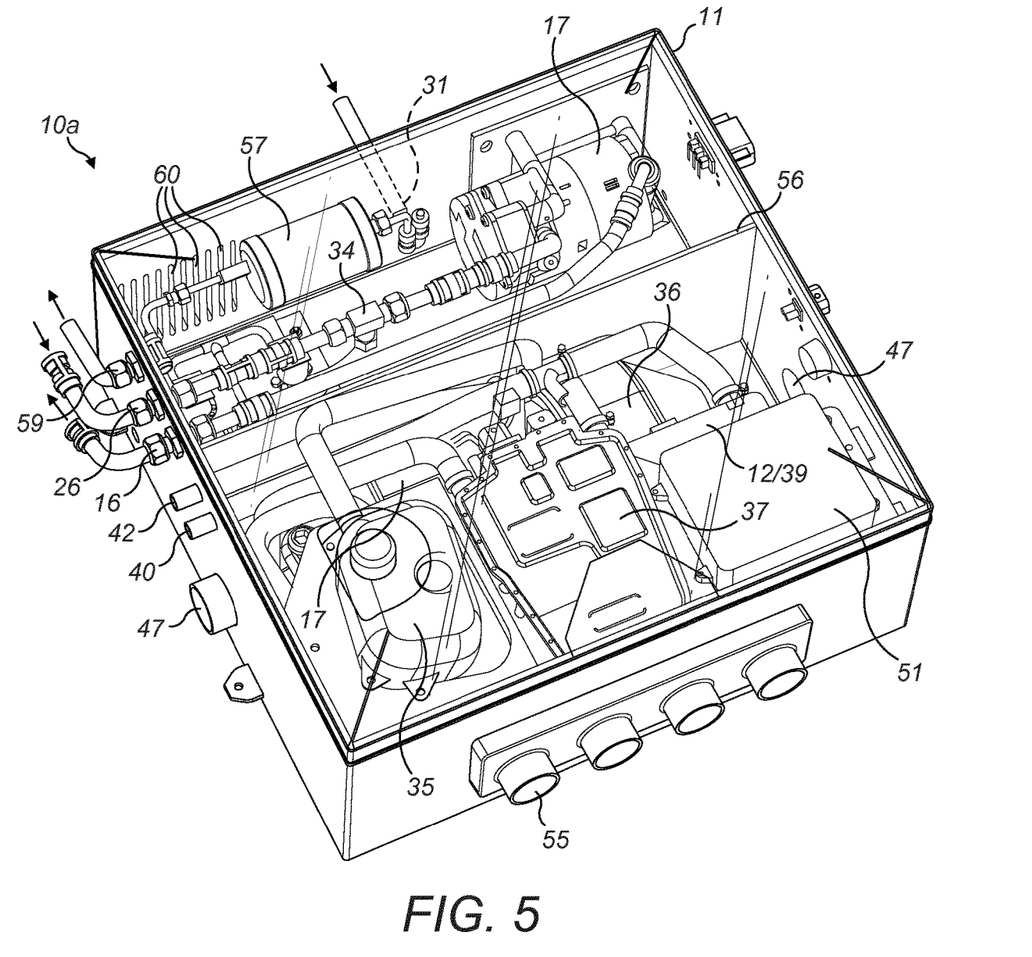
FIG. 5 shows a perspective cut-away view of a thermal management unit of a thermal management system of a second embodiment of the invention.

FIG. 5 shows a TMU 10a of a thermal management system 10 of a second embodiment of the invention, in which like features of the TMU 10a of the first embodiment described previously retain the same reference numerals and will not be described in detail again. FIG. 6 shows a schematic diagram of the thermal system of the second embodiment of the invention.

As with the TMU 10a of the of the first embodiment, the TMU 10a of the second embodiment comprises a housing 11 containing a compressor 13, a first evaporator 12 and first thermal expansion valve 14, a first fan 17, pump 36, a heater 37 and header tank 35. However, there are number of differences with the TMU 10a of the second embodiment over the TMU of the first embodiment.

One difference with the TMU 10a of the second embodiment is that the ventilation passage 18 within the housing 11 is omitted. The housing includes two airflow inlets 47, one on either side of the housing 11. This arrangement may be advantageous to receive return airflow from battery packs 104, 105 positioned on either side of the housing, as illustrated in the schematic drawing of FIG. 3. The return airflow feeds through the airflow inlets 47 directly into the internal space within the housing 11. The ventilation passage manifold 19 and therefore manifold outlets 20 are also omitted, and instead, an external airflow manifold 55 is provided on the outside of the housing 11. The first fan 17 is configured to draw air from the internal space within the housing 11 and blow it over the first evaporator 12 or first heater matrix 39 and directly out of the housing 11 through the external airflow manifold 55. The airflow feed ducts 46 may be connected to the external airflow manifold 55 for the out-flowing air from the housing 11 to be fed to the battery packs 104, 105. The airflow control valves 49 may be provided in the external airflow manifold 55, or between the respective outlets of the external airflow manifold 55 and the airflow feed ducts 46, or even within the airflow feed ducts 46, within the scope of the invention. Yet further, the housing 11 may include a single airflow outlet 21, and the air flow may be divided as required downstream of the housing 11 by an external airflow manifold 55 separate to the housing 11. However, advantageously, the external airflow manifold 55 is connected to the housing 11 such that the TMU 10a provides a more complete, modular component of the thermal management system 10 and the number of components of the thermal management system 10 separate to the TMU 10a that need to be provided on the vehicle is minimised.

Advantageously, the housing 11 comprises an internal wall 56 which divides the housing 11 into two compartments. The compressor 13 is disposed on one side of the internal wall 56 in a first compartment, and the a first evaporator 12 and first thermal expansion valve 14, first fan 17, pump 36, heater 37 and header tank 35 are disposed on the other side of the internal wall 56 in a second compartment. This advantageously prevents or limits heat generated by the compressor 13 from heating the air within the housing 11 which would render operation of the thermal management system 10 less efficient if either the cab 111 or battery packs 104, 105 are to be cooled. An external wall of the housing 11 which forms part of the first compartment may include ventilation apertures, such as slots 60 (see FIG. 5) to allow air heated by the compressor 13 to vent to atmosphere.

The TMU 10a of the second embodiment further comprises a drier 57 within the housing 11. Referring to FIG. 6, the third pipe 29 which returns refrigerant from the condenser 27 does not split into first and second branches 29a, 29b at the junction 30 as in the first embodiment, but instead passes into the housing through the second inlet port 31 and feeds directly into the drier 57. The drier 57 serves to remove any water, moisture or condensation which may have formed within the refrigerant system, which could otherwise freeze within the system or may result in corrosion of the system components. After exiting the drier 57, the refrigerant passes to a junction 58 where one branch passes to the first thermal expansion valve 14 and to the first evaporator 12 via the first control valve 32. The other branch passes out of the housing 11 through a third outlet port 59 via the second control valve 33 and passes to the second thermal expansion valve 23 and to the second evaporator 22. Thereafter, the configuration of the thermal management system 10 of the second embodiment is as per the first embodiment described previously. An advantage of the TMU 10a of the second embodiment is that all refrigerant passes through the drier 57 before selectively flowing to the first and/or second thermal expansion valves 14, 23 and evaporators 12, 22, with the technical benefit associated with the drier 57 mentioned above.

FIG. 7 shows a schematic view similar to that of FIG. 2, but of a thermal management system 10 of a third embodiment of the invention, in which like features of the thermal management system 10 the first embodiment described previously retain the same reference numerals and will not be described in detail again.

A difference with the thermal management system 10 of the third embodiment is that the first and second heater valves 44, 45 are omitted and in place of the heating pipe junction 38 there is provided a first 3-way control valve 61. The first 3-way control valve 61 can be selectively controlled to permit flow of heating fluid from the heater 37 to both the first and second heater matrices 39, 41, or to permit flow of heating fluid from the heater 37 to the first heater matrix 39 and prevent flow of heating fluid to the second heater matrix 41, or to permit flow of heating fluid from the heater 37 to the second heater matrix 41 and prevent flow of heating fluid to the first heater matrix 39.

Such control of the first 3-way control valve 61 can be determined depending on whether heating is required to the battery packs 104, 105, to the cab 111 or both.

The thermal management system 10 of the third embodiment may also include a second 3-way valve 62 in the return heating fluid pipes from the first and second heater matrices 39, 41 and upstream of the pump 36. The second 3-way control valve 62 may be controlled in parallel with the first 3-way control valve 61 to ensure the heating fluid circuits to the first and second heater matrices 39, 41 are fully open or fully isolated from each other, as necessary.

The first and second 3-way control valves 61, 62 may be connected to, and thereby configured to be controlled by, the control apparatus 51, as illustrated in FIG. 4. Note that FIG. 4 shows all possible components which may be controlled by the control apparatus 51 for ease of illustration, and so in the embodiments described, the control apparatus 51 would not control the first and second 3-way valves 61, 62 as well as the first and second heater valves 44, 45.

A further difference with the thermal management system 10 of the third embodiment is that the first and second control valves 32, 33 are omitted and in place of the junction 30 there is provided a third 3-way control valve 63. The third 3-way control valve 63 can be selectively controlled to permit flow of refrigerant from the condenser 27 to both the first and second thermal expansion valves and first and second evaporators 12, 22, or to permit flow of refrigerant from the condenser 27 to the first thermal expansion valve and evaporator 14, 12 and prevent flow of refrigerant to the second thermal expansion valve and evaporator 23, 22, or to permit flow of refrigerant from the condenser 27 to the second thermal expansion valve and evaporator 23, 22 and prevent flow of refrigerant to the first thermal expansion valve and evaporator 14, 12. Such control of the third 3-way control valve 63 can be determined depending on whether cooling is required to the battery packs 104, 105, to the cab 111 or both.

The third 3-way control valve 63 may be connected to, and thereby configured to be controlled by, the control apparatus 51, as illustrated in FIG. 4. Note that FIG. 4 shows all possible components which may be controlled by the control apparatus 51 for ease of illustration, and so in the embodiments described, the control apparatus 51 would not control the third 3-way valves 63 as well as the first and second control valves 32, 33.

It is intended within the scope of the invention that the first and optionally also the second 3-way control valve 61, 62 may be provided, as with the third embodiment of the invention, and the third 3-way control valve 63 may be omitted and the first and second control valves 32, 33 may be provided as with the first embodiment of the invention. Alternatively, the third 3-way control valve 63 may be provided as with the third embodiment of the invention, and the first and second 3-way control valves may be omitted and instead the first and second heater valves 44, 45 may be provided, as with the first embodiment of the invention.

It will be appreciated from the above that the thermal management system 10 of the invention including the thermal management unit 10a provides a number of common components of a HVAC system for a vehicle to enable heating, cooling, or both, of one or more battery packs as well as the vehicle cab. These common components are provided in a single central self-contained "module" or unit 10a. This configuration of system provides an efficient HVAC system architecture for a vehicle and saves duplication of HVAC system components in the vehicle. For example, a conventional electric vehicle may include completely separate heating and/or cooling systems respectively for the battery packs and vehicle cab/passenger compartment, and commonly each battery pack of an electric vehicle comprises its own heating and cooling unit. A single compressor alone may weigh 30 to 40 kg. The configuration of thermal management unit and system of the invention is thereby more cost-effective and light-weight than conventional thermal management systems for vehicles. In the context in particular of electric vehicles and environmentally friendly transport, weight saving is a key factor in increasing fuel economy and energy efficiency. The thermal management system 10, particularly the provision of the thermal management unit 10a, also enables the thermal management system to be applied to a variety of different vehicles, making the system more universally applicable, and so facilitates more cost-effective vehicle manufacturing. This also significantly reduces the number of heating and cooling fluid pipes that need to be provided in a vehicle. Yet further, maintenance of the vehicle heating and cooling system is rendered easier as a large number of the system components are centrally located contained within the housing 11.

In addition to the above, the thermal management system of the invention allows heating or cooling demand to be split between the battery packs and the vehicle passenger cab or compartment, to heat one or other or both, or cool one or other or both, or heat one and cool the other, and vice versa. Furthermore, with the optional inclusion of airflow control valves 49 as discussed above, heating demand from different battery packs can be controlled to maintain multiple battery packs at the same temperature or within a predetermined acceptable temperature range. Such differing heating or cooling demand from multiple battery packs may arise from the location of battery packs on the vehicle (e.g. one battery pack may be more exposed to ambient conditions than another battery pack), or from differing power demand from different battery packs due to charge level balancing and control by the power control electronics.

The thermal management system of the invention also reduces system heat and energy losses that would otherwise occur in a vehicle having two or more completely separate heating/cooling systems. For example, the system does not include the energy losses through inefficiencies of multiple duplicated components, such as multiple compressors, multiple heat pumps, multiple heaters, etc.

Although in the embodiments described above, the heated or cooled airflow is driven by a single first fan 17, more than one fan or blower maybe provided in the air flow circuit to maintain the flow of air between the TMU 10a and the battery packs 104, 105.

It will be appreciated that, although the exemplary embodiments of the thermal management system 10 and TMU 10a of the invention described above are described in the context of a vehicle having two battery packs 104, 105, the invention is not limited to such an application, and it is intended that the thermal management system 10 and TMU 10a may be used with vehicles having one battery pack or more than two battery packs within the scope of the invention. Such use with more than two battery packs may be implemented by providing an appropriate number of housing airflow outlets 21 or an external airflow manifold 55 with an appropriate number of outlet orifices for the outflow of air to the respective battery packs. For example, the external airflow manifold 55 of FIG. 5 comprises four outlet orifices which may respectively be connected to four separate battery packs. Alternatively, the TMU 10a of FIG. 5 may be used in a vehicle with fewer than four battery packs and the unused outlet orifices of the external airflow manifold 55 may be capped or otherwise blocked off.

It is intended within the scope of the invention that the various "ports" of the housing 11 described herein may be connectors for connection of respective fluid pipes to the housing, or may simply be an aperture or other fluid access region in the housing for the passage of respective fluid into or out of the housing. For example, such ports could comprise an aperture within the housing through which a respective fluid pipe passes.

It is intended within the scope of the invention that the thermal management system may be configured to only heat or cool airflow for passage of the airflow out of the housing and to return back into the housing. For example, for the supply only of heating or cooling airflow for one of more vehicle battery packs. Such an embodiment would omit a second radiator and second evaporator being connected to the housing.

It is intended within the scope of the invention that that the various control valves (i.e. heating control valves and refrigerant control valves) may be omitted, such that the thermal management system is configured to heat or cool by control of operation of the pump 36 and heater 37, or compressor 13 without selectively determining whether the heating fluid or refrigerant respectively passes to the first or second radiator or first or second evaporator.

It is intended within the scope of the invention that the radiators or heating matrices described herein comprise any configuration of device through which a heated fluid may pass, and over which an airflow may be generated, such that heat transfer is effected from the radiator to the passing airflow.

Although in all embodiments shown and described, a thermal expansion valve is provided in combination with the respective evaporator, the invention is not limited to such configuration and the or each thermal expansion valve may alternatively be omitted.

The embodiments of the invention shown in the drawings and described above are exemplary embodiments only and are not intended to limit the scope of the invention, which is defined by the claims hereafter. It is intended that any combination of non-mutually exclusive features described herein are within the scope of the present invention.

The invention claimed is:

1. A thermal management unit for providing cooling or heating to regions of a vehicle, the thermal management unit comprising a housing containing:
a compressor and a first evaporator of a refrigerant system;
a pump, a heater and a first radiator of a heating system; and
a blower, wherein the blower is configured to force air over the first evaporator and first radiator to cool or heat the air;
wherein the housing comprises an airflow outlet through which the cooled or heated air can exit the housing, and an airflow inlet though which air can enter the housing to be recirculated by the blower;
wherein the housing comprises a first refrigerant outlet port through which refrigerant compressed by the compressor can pass out of the housing, and a first refrigerant inlet port through which refrigerant can return into the housing, the first refrigerant inlet port being in fluid communication with the first evaporator for the supply of returning refrigerant to the first evaporator; and
wherein the housing includes a heating fluid outlet port through which heating fluid under pressure from the pump and heated by the heater, can pass out of the housing.

2. A thermal management unit according to claim 1 comprising a heating fluid inlet port through which heating fluid can return into the housing, the heating fluid inlet port being in fluid communication with the pump for the supply of returning heating fluid to the pump.

3. A thermal management unit according to claim 1, wherein the housing contains a drier in fluid communication between the first refrigerant inlet port and the first evaporator such that refrigerant returning into the housing through the first refrigerant inlet port passes through the drier before passing to the first evaporator.

4. A thermal management unit according to claim 1, wherein the housing includes a partition dividing the interior of the housing into a first section and a second section, and wherein the compressor is disposed in the first section, and wherein the first evaporator is disposed in the second section.

5. A thermal management unit according to claim 4 wherein the partition comprises a dividing wall that is configured to prevent or restrict heat transfer between the first and second sections of the housing.

6. A thermal management unit according to claim 1, wherein the airflow outlet includes an outlet manifold having two or more manifold outlets, the manifold configured such that airflow out of the housing passes through the two or more manifold outlets.

7. A thermal management unit according to claim 1, wherein an airflow control valve is provided in the airflow outlet or one or more of the manifold outlets, to selectively prevent, permit or restrict airflow through the airflow outlet or one or more of the manifold outlets.

8. A thermal management unit according to claim 1, wherein the pump is configured to pump heating fluid to an inlet of the heater, and an outlet of the heater is fluidly communicated with an inlet of the first radiator, and wherein a first heating valve is disposed in a pipe fluidly connecting the heater to the first radiator.

9. A thermal management unit according to claim 1, wherein:
the pump is configured to pump heating fluid to an inlet of the heater, and an outlet of the heater is fluidly communicated with an inlet of the first radiator, and wherein a first heating valve is disposed in a pipe fluidly connecting the heater to the first radiator, and
the outlet of the heater is also fluidly communicated with the heating fluid outlet port, and a second heating valve is disposed in a pipe fluidly connecting the heater to the heating fluid outlet port.

10. A thermal management unit according to claim wherein:
the pump is configured to pump heating fluid to an inlet of the heater, and an outlet of the heater is fluidly communicated with an inlet of the first radiator, and wherein a first heating valve is disposed in a pipe fluidly connecting the heater to the first radiator, and
the outlet of the heater is also fluidly communicated with the heating fluid outlet port, and the first heating valve comprises a three-way valve which is disposed between an outlet of the heater, an inlet of the first radiator and the heating fluid outlet port.

11. A thermal management unit according to claim 2, wherein an outlet of the first radiator is fluidly connected to an inlet of the pump, and wherein the heating fluid inlet port is also connected to an inlet of the pump, and wherein a three-way heating valve is disposed between the outlet of the first radiator, the heating fluid inlet port and the inlet of the pump.

12. A thermal management unit according to claim 3 wherein a first refrigerant valve is disposed in a pipe fluidly connecting the drier to the first evaporator.

13. A thermal management unit according to claim 12, wherein the housing further comprises a second refrigerant outlet port in fluid communication with an outlet of the drier, and wherein a second refrigerant valve is disposed in a pipe fluidly connecting an outlet of the drier to the second refrigerant outlet port.

14. A thermal management unit according to claim 12, wherein the housing further comprises a second refrigerant outlet port in fluid communication with an outlet of the drier, and wherein the first refrigerant valve comprises a three-way valve which is disposed between an outlet of the drier, an inlet of the first evaporator and the second refrigerant outlet port.

15. A thermal management unit according to claim 1, wherein the housing further comprises a first thermal expansion valve in fluid communication with the first evaporator and configured such that refrigerant passes through the first thermal expansion valve before passing into the first evaporator.

16. A thermal management unit according to claim 1, wherein a ventilation passage is provided within the housing extending between the airflow inlet and the airflow outlet, and wherein the first evaporator and the first radiator are disposed within the ventilation passage, and wherein the blower is configured to drive airflow from the inlet to the outlet through the ventilation passage.

17. A thermal management unit according to claim 1, further comprising a control apparatus comprising at least one processor and at least one memory, wherein the control apparatus is connected to and configured to control operation of one or more of the compressor, pump, heater, blower, the or each airflow control valve, the first and/or second heating valves, and the first and/or second refrigerant valves.

18. A thermal management system comprising a thermal management unit according to claim 1, further comprising a condenser disposed outside the housing, wherein the first refrigerant outlet port is fluidly communicated with an inlet of the condenser, and an outlet of the condenser is fluidly communicated with the first refrigerant inlet port.

19. A vehicle comprising a chassis, a cab, at least one battery pack, and a thermal management system according to claim 1, wherein the thermal management unit is configured to feed the heated or cooled airflow from the airflow outlet to the at least one battery pack, and to feed airflow back from the at least one battery pack to the airflow inlet.

* * * * *